United States Patent [19]

Ikoma et al.

[11] Patent Number: 5,685,892
[45] Date of Patent: Nov. 11, 1997

[54] METALLURGICAL FURNACE INSTALLATION FOR USE IN COPPER SMELTING PROCESS AND METHOD FOR CHARGING ANODE SCRAP INTO FURNACE

[75] Inventors: Hiroaki Ikoma; Akiyoshi Yamashiro, both of Tokyo; Kiyoshi Fujiwara; Nobuhiro Oguma, both of Kagawa-gun, all of Japan

[73] Assignee: Mitsubishi Materials Corporation, Tokyo, Japan

[21] Appl. No.: 655,685

[22] Filed: Jun. 3, 1996

[51] Int. Cl.[6] ................................................ C22B 9/00
[52] U.S. Cl. .................. 75/652; 266/216; 266/901; 75/646
[58] Field of Search .................. 266/200, 176, 266/183, 901, 216; 75/581, 646, 652

[56] References Cited

U.S. PATENT DOCUMENTS

| 4,274,785 | 6/1981 | Ogawa et al. | 266/183 |
|---|---|---|---|
| 4,581,063 | 4/1986 | Oyabu et al. | 266/901 |
| 5,497,978 | 3/1996 | Yamashiro et al. | 266/176 |

*Primary Examiner*—Scott Kastler
*Attorney, Agent, or Firm*—Oblon, Spivak, McClelland, Maier & Neustadt, P.C

[57] ABSTRACT

A metallurgical furnace installation for use in copper-smelting process is disclosed which includes a metallurgical furnace, a charging assembly for introducing anode scrap into the furnace through an opening, and an impingement-preventing device attached to the charging assembly for preventing the anode scrap from impinging on a furnace bottom upon charging, whereby the furnace bottom will not be damaged. The impingement-preventing device may be a turning mechanism attached to a chute for turning the anode scrap being introduced, or may be a bending press for bending a leading end of the anode scrap. Additionally, a method for charging anode scrap into a metallurgical furnace of a copper smelting installation is also disclosed.

15 Claims, 7 Drawing Sheets

METALLURGICAL FURNACE INSTALLATION FOR USE IN COPPER SMELTING PROCESS AND METHOD FOR CHARGING ANODE SCRAP INTO FURNACE

BACKGROUND OF THE INVENTION

1. Field of the Invention

The present invention relates in general to a metallurgical furnace installation for use in a copper-smelting process, and more particularly to improved arrangements for charging anode scraps into a copper-smelting furnace such as a converting furnace. The invention further pertains to a method for charging anode scraps into a copper-smelting metallurgical furnace, such as a converting furnace.

2. Related Art

In a process for continuous smelting of copper sulfide ore, an apparatus for carrying out the process and comprising a smelting furnace, a separating furnace, and a converting furnace contiguously connected together via launders (known as the MI process) has conventionally been known. The process comprises the steps of first melting copper concentrates in the smelting furnace to produce matte mainly containing copper sulfide and iron sulfide, and slag mainly consisting of gangue contained in the raw material, flux, and iron oxides, then separating matte from slag in the separating furnace. Subsequently, blister copper is produced through oxidation of matte in the converting furnace. The thus-obtained blister copper melt is directed into an anode furnace where the grade of copper is improved through oxidation and reduction reactions. The melt is then cast into an anode for electrorefining to obtain the finished products.

In the electrorefining step, although the anode erodes during the progress of refining, the entire mass of the anode is not fully utilized; flakes of anode scrap remain as residue. It is, therefore, a common practice to charge the residual anode scrap again into the smelting furnace or the separating furnace for reuse of the anode scrap.

However, because anode scrap is high-grade copper available from the anode furnace, it is not desirable from the point of view of energy efficiency to again charge anode scrap into the smelting furnace or the separating furnace. Therefore, it has been recent practice to reuse anode scrap by charging it into a converting furnace. However, after the operation of such a reuse system for anode scrap for a considerable period of time, it has been found that some unfavorable damage is caused at the furnace bottom, probably by anode scraps impinging thereagainst upon charging of scrap into the furnace.

SUMMARY OF THE INVENTION

It is therefore the primary object of the present invention to provide a metallurgical furnace installation for use in copper-smelting process, which installation permits anode scraps to be charged into a copper-smelting furnace such as a conversion furnace, without causing any damage to a furnace bottom thereof.

According to a first aspect of the present invention, there is provided a metallurgical furnace installation comprising:

a metallurgical furnace including a furnace bottom and an upper portion having an opening formed therethrough;

a charging assembly disposed adjacent to the opening for introducing anode scrap into the metallurgical furnace through the opening; and an impingement-preventing device attached to the charging assembly for preventing the anode scrap from impinging onto the furnace bottom during charging, whereby the furnace bottom will not be damaged.

In the foregoing, the anode scrap is in the form of sheets or plates of a generally rectangular shape having a pair of leading and trailing ends and having a pair of laterally outwardly-extending shoulder protrusions formed at the trailing end, and the charging assembly has an inclined chute attached to the upper portion of the metallurgical furnace and constructed so as to introduce the anode scrap into the metallurgical furnace in an inclined manner such that the leading end is directed towards the furnace bottom while the trailing end is positioned away from the furnace bottom.

In accordance with the invention, the impingement-preventing device may comprise a turning unit attached to the chute for turning the anode scrap being introduced by the chute in a vertical plane, or may comprise a Rending press for bending the leading end of the anode scrap.

In the case of the former, the turning unit may include at least one pair of jump rails disposed on an inclined surface of the chute and constructed to hold the shoulder protrusions, the jump rails extending upwardly with respect to the inclined surface in a direction towards the furnace bottom, whereby the trailing end of the anode scrap slides up on the jump rails while the leading end thereof slides on the inclined surface of the chute. The jump rails may be constructed and dimensioned such that when the anode scrap reaches a melt in the metallurgical furnace, the anode scrap is in a generally horizontal attitude.

In the case of the latter, the bending press may be arranged to bend the leading end of the anode scrap in such a direction that when the anode scrap is positioned in the chute, a bent portion is directed upwards with respect to inclination of the chute. The bending press may include: first and second holding members operably associated with each other for releasably holding the anode scrap therebetween, the first and second holding members having pressing portions facing towards each other, the first holding member further including an inclined portion; and a bending member disposed in opposed relation to the inclined portion of the first holding member, the bending member being operable to press the leading end of the anode scrap against the inclined portion of the first holding member.

According to a second aspect of the invention, there is provided a method for charging into a melt of a metallurgical furnace of a copper smelting installation an anode scrap which is in the form of a generally rectangular shape having a pair of leading and trailing ends and having a pair of laterally outwardly-extending shoulder protrusions formed at said trailing end, said method comprising the step of charging into the melt of said metallurgical furnace while preventing the anode scrap from impinging on a furnace bottom during charging.

In the foregoing, the charging step may comprise turning the anode scrap in a vertical plane to increase resistance to be exerted by the melt on the anode scrap to such an extent that the anode scrap does not directly travel to the furnace bottom on charging. In this case, it is preferable that the anode scrap be turned such that when the anode scrap reaches the melt in the metallurgical furnace, the anode furnace is brought into a generally horizontal posture. Furthermore, the charging step may comprise bending the leading end of the anode scrap in such a direction that when the anode scrap is introduced in the metallurgical furnace, a bent portion is directed upwards with respect to a direction of introduction of the anode scrap.

DETAILED DESCRIPTION OF THE PREFERRED EMBODIMENTS

A conversion furnace is the most suitable metallurgical furnace in the context of the present invention. Therefore, a converting furnace installation will be hereinafter described with reference to the accompanying drawings. However, the converting furnace may be replaced by another copper-smelting furnace such as a separating furnace. Furthermore, the converting furnace is not limited to that used in the continuous copper smelting process, but may be of any other type such as a conventional flash converter.

Moreover, anode scrap to be reused in the present invention is formed into a sheet 1 or plate of a generally rectangular shape having a pair of leading and trailing ends and having a pair of laterally outwardly-extending shoulder protrusions formed at the trailing end and serving as engagement 1a for facilitating transfer.

Figure 1:
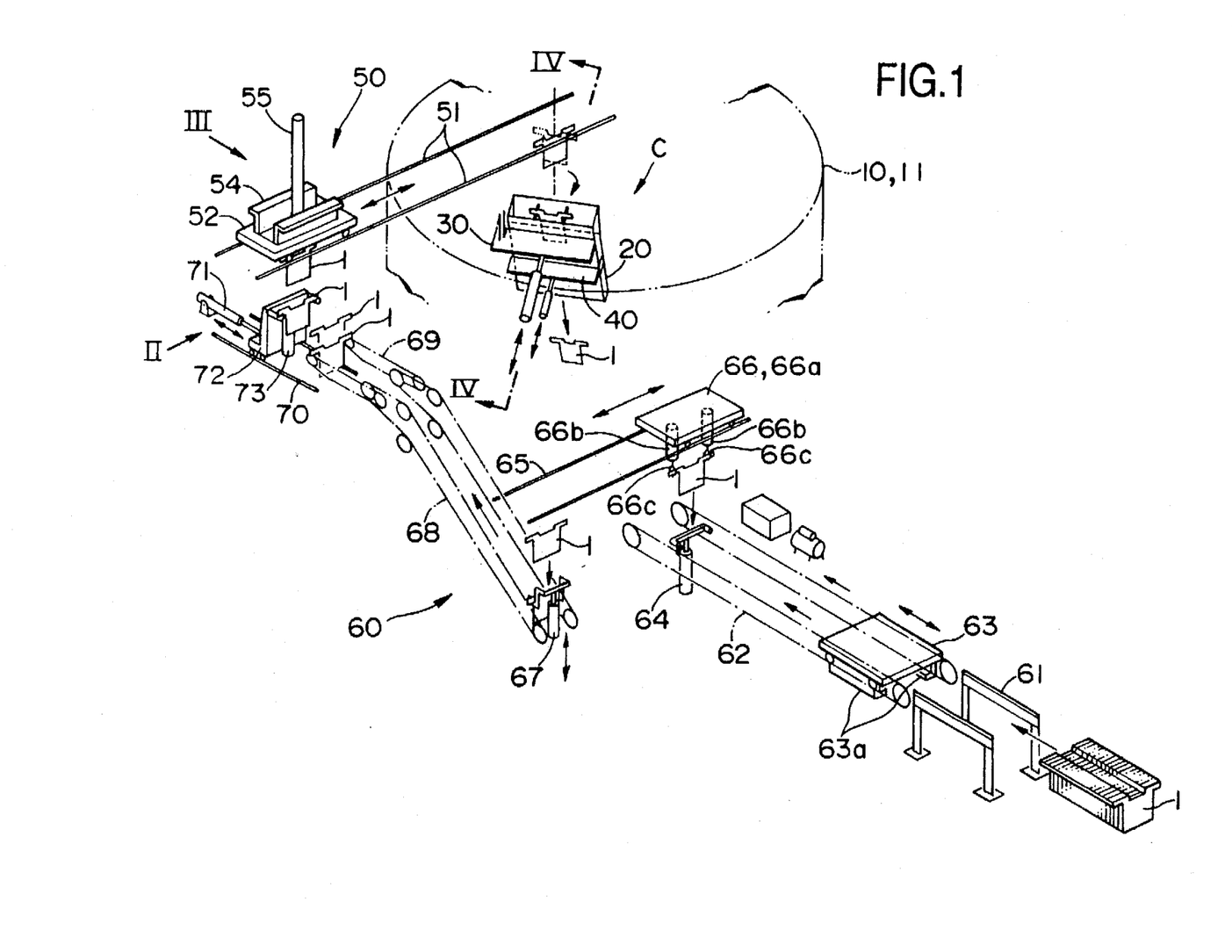
FIG. 1 is a schematic view of a conversion furnace installation in accordance with a first embodiment of the present invention.

FIG. 1 depicts an overall schematic view of a converting furnace installation in accordance with a first embodiment of the present invention. The installation in general comprises a converting furnace 10, a charging assembly C attached to the converting furnace 10 for introducing anode scrap 1 into the converting furnace 10, and an impingement-preventing device I attached to the charging assembly C for preventing the anode scrap from impinging on a furnace bottom upon charging, whereby the furnace bottom is not damaged.

The converting furnace 10 has a conventional construction having a furnace bottom, a circular surrounding side wall joined at a lower end to the furnace bottom, and a ceiling 11 joined to an upper end of the surrounding wall, and includes an inlet for matte and an outlet for blister copper. In accordance with the present invention, the converting furnace further includes an opening 11a for introducing anode scrap thereinto. In the illustrated embodiments, the opening for anode scrap is formed in the ceiling 11, but may be formed in another upper portion of the furnace, such as in the upper portion of the side wall.

The charging assembly C includes a chute assembly having a chute 20 of a generally rectangular cross-section secured onto the inner surface of the through-opening 11a of the converting furnace 10, and an outer shutter 30 and an inner shutter 40 provided spaced apart longitudinally of the chute 20 and adapted to open and close independently of each other. The charging assembly C further includes a loading mechanism 50 provided for transporting the anode scrap 1 to a position above the opening upper end of the chute 20 and charging it into the chute 20, and a transfer mechanism 60 provided for transferring the anode scrap 1 to this loading mechanism 50.

As best shown in FIG. 1, the transfer mechanism 60 comprises a rack 61 for temporarily storing the transferred anode scrap sheets 1; a stock conveyor 62, provided adjacent the rack 61, for transferring the anode scrap sheets 1 to a first transfer mechanism 66 (described later) while keeping its vertical posture; a bogie 63, provided so as to be self-travellable on rails (not shown) installed above the stock conveyor 62 and rack 61, which holds the anode scrap sheets 1 placed on the rack 61 in the vertical position with arms 63a and puts it on the stock conveyor 62. Four electrically driven jacks (not shown) are provided to move the arms 63a of the bogie 63 vertically. A first lifter 64 is installed below the terminal end of the stock conveyor 62 for lifting the anode scrap sheets 1 transferred by the stock conveyor 62 one by one by extension and retraction of a hydraulic cylinder. Rails 65 extend from above the first lifter 64 to above the lower end of an inclined conveyor 68 (described later). A first transfer unit 66, provided so as to be self-travellable on the rails 65, receives the anode scrap sheets 1 from the first lifter 64 and transfers them to a second lifter 67 (described later); the second lifter 67 receives the anode scrap sheets 1 from the first transfer unit 66 and lowers the sheets, via an air cylinder, to a starting end (lower end) of the inclined conveyor 68, provided adjacent the second lifter 67, engages the anode scrap sheets 1 brought down by the second lifter 67 and transfers them diagonally upward. A fast-feed conveyor 69, provided contiguously with the terminal end (upper end) of the inclined conveyor 68, transfers the anode scrap sheets 1 at a speed about twice as high as the transfer speed of the inclined conveyor 68. A lift-arm bogie 72 travels forward and backward by the action of an electrically driven ball-screw mechanism 71 on rails 70 installed below the terminal end of the fast-feed conveyor 69. A lift arm 73 is provided on the front face (right side surface in FIG. 1) of a lift-arm bogie 72, and receives the anode scrap sheets 1 at the terminal end of the fast-feed conveyor 69 and lifts up the anode scrap sheets 1 by extension of an air cylinder at the time it receives two anode scrap sheets 1, and delivers them to the loading mechanism 50.

The first transfer mechanism 66 explained above comprises a bogie 66a with its wheels on the rails 65; two lifting cylinders 66b fixed to the lower surface of the bogie 66a; and chucks 66c, fitted to the rods of the lifting cylinders 66b for holding and releasing the anode scrap sheets 1.

Figure 2:
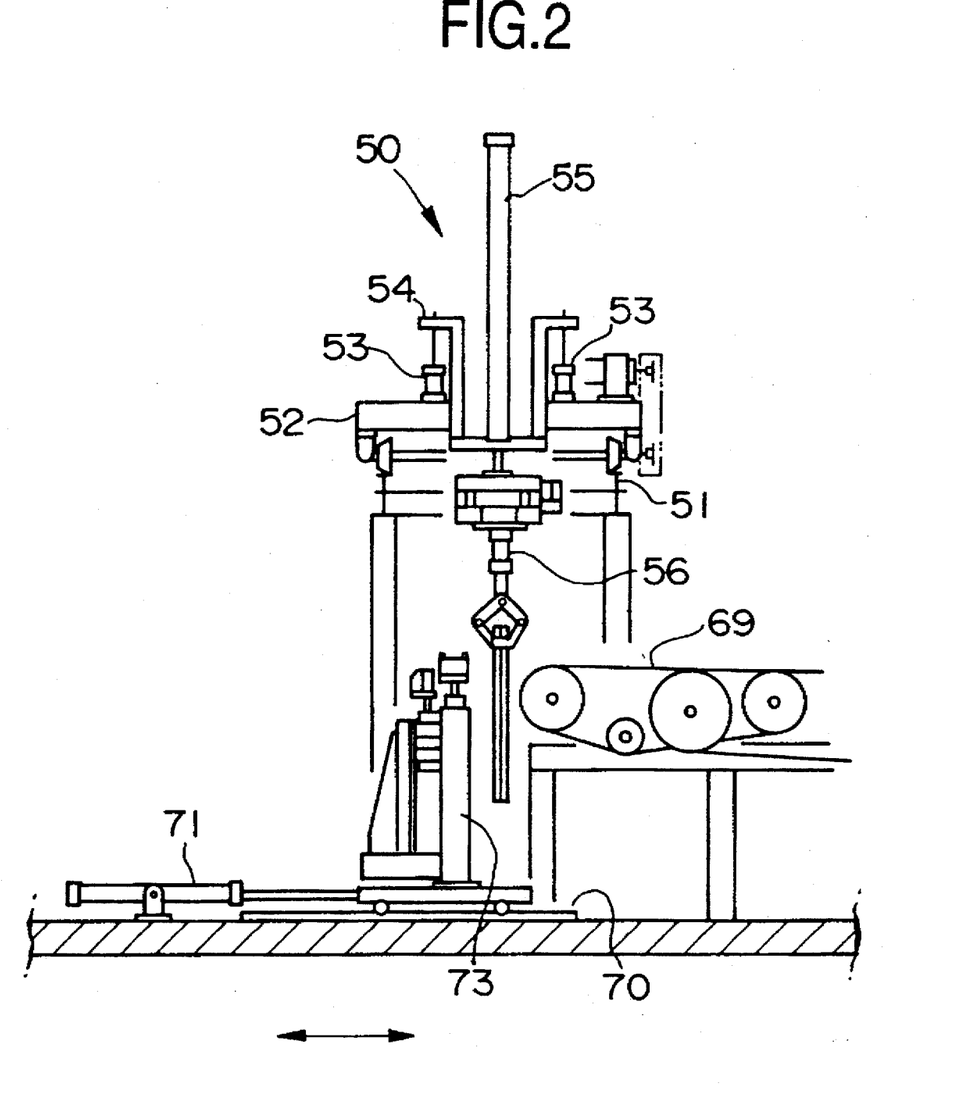
FIG. 2 is an enlarged view of a part of the installation of FIG. 1 as viewed in the direction of arrow II in FIG. 1.
Figure 3:
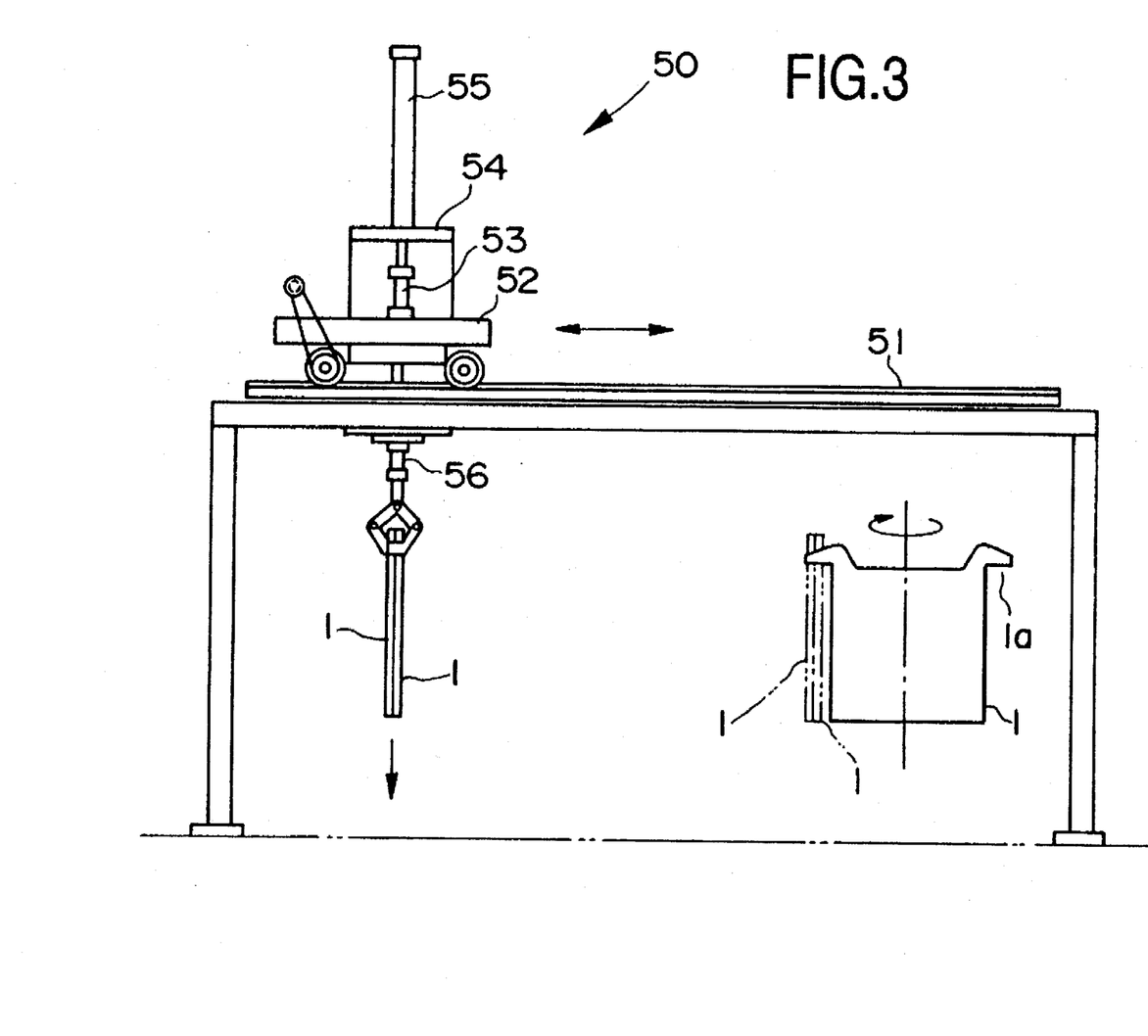
FIG. 3 is an enlarged view similar to FIG. 2, but as viewed in the direction of arrow III in FIG. 1.

The above-mentioned loading mechanism 50 comprises rails extending from above the setback position, defined as the position at which the ball-screw mechanism 71 is set back to the left side in FIG. 1, of the lift-arm bogie 72 to above the chute 20 (see FIGS. 1 to 3); a bogie 52 having wheels which engage the rails 51 so as to be self-travellable; and two first lifting cylinders 53 provided vertically on the upper surface of the bogie 52 as shown in FIG. 2. The cylinders 53 are provided with rods on the upper side. A substantially U-shaped sliding plate 54 is secured to the rods of the first lifting cylinders 53 and slidably engaged relative to the bogie 52. A second lifting cylinder 55 is secured to the sliding plate 54 with the rod directed downward, so that the rod is movable in the axial direction relative to the sliding plate 54. A chuck 56 is rotatably fitted to the lower end of the rod of the lifting cylinder 55 around the rod axis and holds the anode scrap sheets 1, and a rotation mechanism (not shown) rotates the chuck 56 through an angle of about 56° around the axis. The rotating mechanism comprises an air cylinder and a link mechanism.

Figure 4:
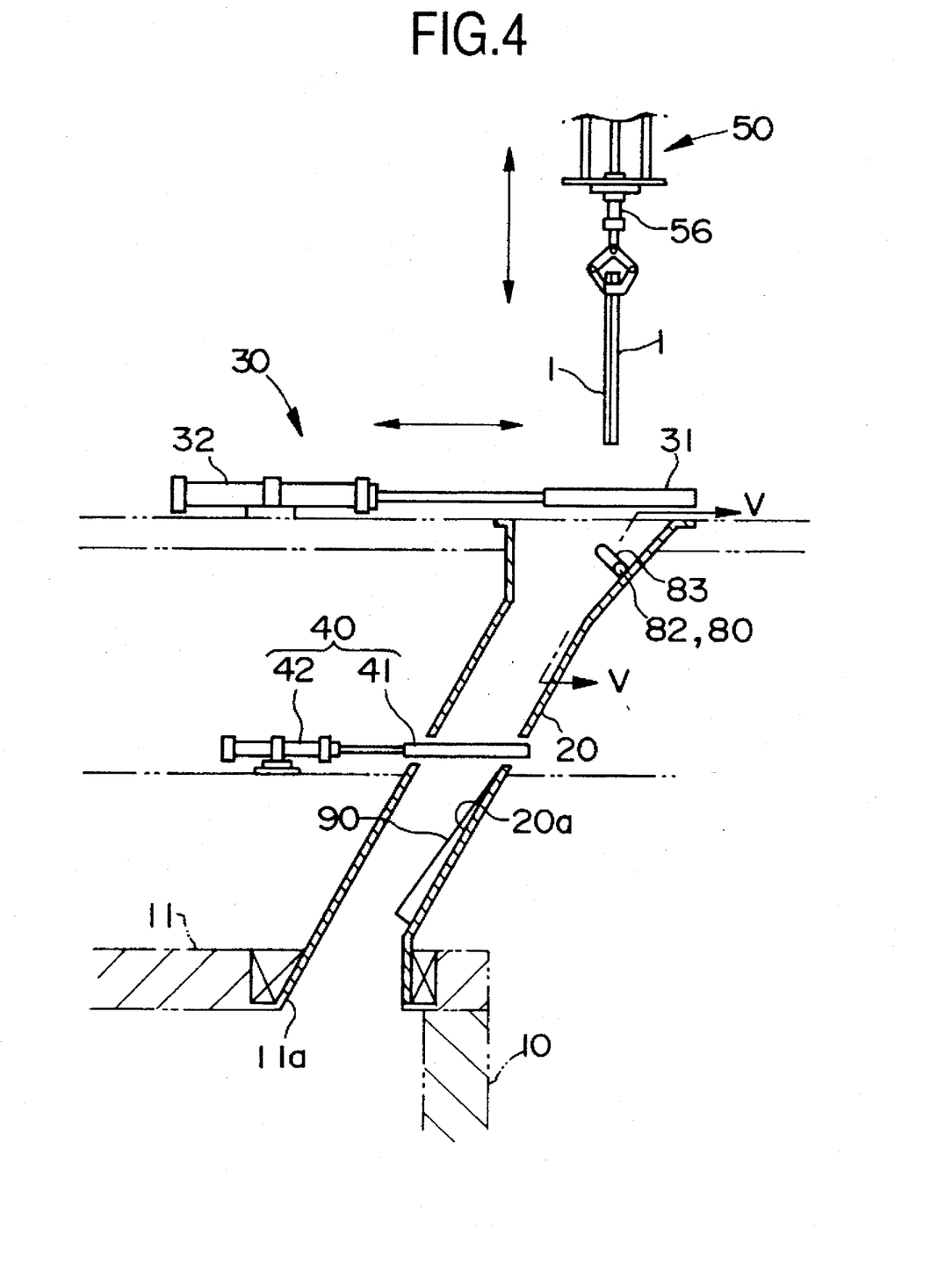
FIG. 4 is an enlarged cross-sectional view of a part of the installation of FIG. 1, as taken along the line IV—IV in FIG. 1.

The outer shutter 30 comprises, as shown in FIG. 4, a plate-shaped shutter body 31 substantially closing the upper end of the chute 20, and an air cylinder 32 controlling horizontal travel of the shutter body 31. Similarly, the inner shutter 40 comprises a shutter body 41 substantially closing the middle portion between the upper and lower ends of the chute 20. An air cylinder 42 drives the shutter body 41 for controlling horizontal movement in a manner like that of body 31.

Figure 5:
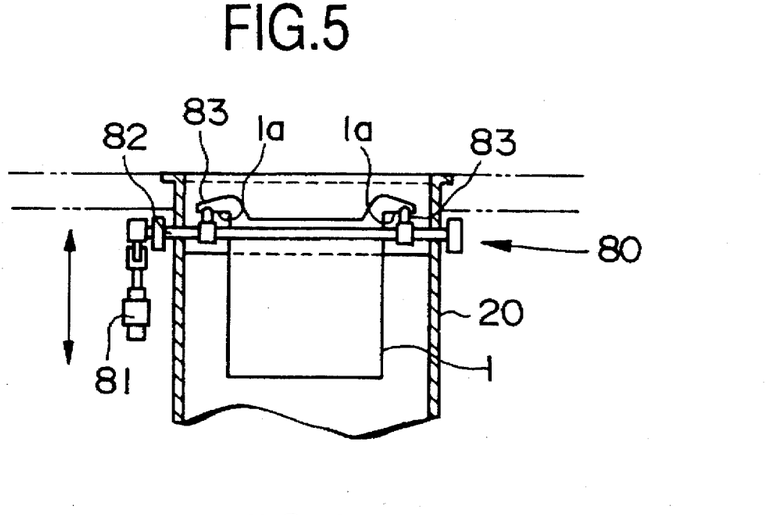
FIG. 5 is a cross-sectional view of a part of the installation as taken along the line V—V in FIG. 4.

As shown in FIGS. 4 and 5, a receiving mechanism 80 provides temporary stoppage of the anode scrap sheets 1 charged into the chute 20 and is positioned in the chute 20, between the shutter body 31 and the shutter body 41. This receiving mechanism 80 comprises a rotation shaft 82 which passes through the chute 20 in the width direction and is rotated through an angle of about 80° by a link by extension and retraction of cylinder 81. Two substantially parallel bar-shaped projections 83 are fixed to the rotation shaft 82 and spaced apart from each other by a gap slightly smaller than the gap of the engagements 1a formed at the shoulder portions of each anode scrap sheet 1. The projections engage with the engagements 1a of the anode scrap sheet 1 charged into the chute 20.

In the first embodiment, the impingement-preventing device I comprises a turning unit or means attached to the chute 20 for turning the anode scrap sheet 1 passing through the chute in a vertical plane, preferably such that when the anode scrap sheet 1 reaches a melt level in the converting furnace, the anode scrap sheet is brought into a generally horizontal posture, whereby the anode scrap sheet 1 is prevented from impinging directly on the furnace bottom upon charging.

The above-mentioned turning unit may be of any construction, but in FIG. 4, it comprises a pair of jump rails 90 provided on an inclined inner surface 20a of the chute 20 so as to receive the shoulders of the anode scrap sheet 1 and sloping upwardly towards the lower end of the chute to permit the trailing end of the anode scrap sheet 1 to raise upwards with respect to the inner surface 20a of the chute 20 while maintaining the leading end of the anode scrap sheet 1 so as to slide on the inner surface 20a of the chute 20. Thus, with these rails 90, the anode scrap sheet 1 is turned in a counterclockwise direction in FIG. 4 (or FIG. 6) as it slides on the chute 20. As best shown in FIG. 4, the jump rails 90 may be preferably positioned at a portion between the lower end of the chute 20 and the inner shutter 40, although they may be positioned between the inner and outer shutters 40 and 30.

The lengths and inclination angle of the jump rails, as well as the inclination angle and length of the chute 20 itself, may be designed and determined while taking into consideration the actual size or depth of the converting furnace and so on. Although detailed explanation of the experiments is omitted, the inventors have performed experiments to determine various parameters, and have obtained the following results for such various design parameters:

Inclination angle of chute (with respect to horizontal line):
  This angle may range from 30° to 89°, but preferably from 38° to 60°.
Length of chute (length between the lower end of chute and the position of the shoulder protrusions of the anode scrap sheet in standby position in the chute):
  This length depends on the construction of the chute assembly. In the case of the chute with two shutters as illustrated, the chute length must be at least the total length of the anode scrap and the jump rails, whereas when the jump rails are positioned between the two shutters, the chute length must be at least the length of the anode scrap. On the other hand, in the case where only a single shutter (outer shutter) is provided, a length adequate for the accommodation of the jump rails is sufficient as the chute length.
Height of lower end of jump rails from chute surface:
  The height of the lower end of the jump rails must be at least adequate for permitting the proper guiding of the shoulders of the anode scrap, and due to actual height of the shoulder portions, the jump rails should have a height of at least 30 mm. With respect to the upper limit, if the height of the jump rails should exceed the length of the anode scrap, the anode scrap will not turn. Accordingly, the height of the jump rails should be at most the length of the anode scrap, that is about 100 mm.
Position of jump rails (distance from lower end of the chute and the lower end of the jump rails)
  The anode scrap will basically turn about the lower end of the chute. Therefore, it is preferable that the lower end of the chute be close to the center of gravity of the anode scrap. However, the distance may range from zero to about 1000 mm, which corresponds to the length of the anode scrap.
Distance between lower end of chute and the melt:
  This distance depends largely on the arrangement of the installation although in the actual installation of the applicant, the distance may be designed from 500 to 2500 mm.

In the foregoing, the jump rails 90 may simply be formed so as to be straight and so as to have a specified constant inclination angle, but may also be inclined or curved so as to have a progressively increasing inclination angle. It is of course necessary to ensure space in the lower portion of the chute 20 for permitting the turning of the anode scrap sheet 1. To this end, it may be possible to enlarge the cross-section of the chute only at such a lower portion.

The operation of the converting furnace installation having the configuration as presented above will be described.

First, a batch of about 50 anode scrap sheets is placed by means of a forklift or other suitable device onto the rack 61 of the transfer mechanism 60. Then, the bogie 63 is moved on the rack 61, and the engagements 1a of the anode scrap sheet 1 are held by the arms 63a by raising an electrically driven jack fitted to the arms 63a. The bogie 63 is then moved onto the stock conveyor 62, and the anode scrap sheets 1 are placed on the stock conveyor 62 by lowering the electrically driven jack. Thereafter, the anode scrap sheets 1 are positioned, by the stock conveyor 62, above the first lifter 64. The first lifter 64 is extended to cause the leading end thereof to engage with engagements 1a of one anode scrap sheet 1 so as to lift the anode scrap sheet 1. The anode scrap sheet is held by the chuck 66c of the first transfer mechanism 66, and the first lifter 64 returns to its initial position.

After the lifting cylinder 66b of the first transfer mechanism 66 contracts and causes the anode scrap sheet 1 to travel upwardly, the bogie 66a travels on the rails 65 to transfer the anode scrap sheet 1 to a position above the second lifter 67. The lifting cylinder 66b thus extends to lower the anode scrap sheet 1, and at the same time, the second lifter 67 extends and the leading end thereof supports the anode scrap sheet 1, releasing the chuck 66c. Subsequently, the second lifter 67 retracts, and the anode scrap sheet 1 is lowered to engage the inclined conveyor 68. The inclined conveyor 68 lifts the engaged anode scrap sheets and delivers them one by one to the fast-feed conveyor 69. The fast-feed conveyor 69, at its terminal end, places the anode scrap sheets 1 one by one on the upper end of the lift arm 73. When two of the anode scrap sheets 1 are placed on the upper end of the lift arm 73 as a result of these operations, the lift arm 73 extends to slightly raise the two anode scrap sheets and, in this state, the ball-screw mechanism 71 contracts, so that the lift-arm bogie 72 moves to a position below the bogie 52 of the charging mechanism 50. Retraction of the first lifting cylinder 53 lowers the sliding plate 54, whereby the second lifting cylinder 55 and the chuck 56 move downwardly, the anode scrap sheets 1 being held by the chuck 56. After delivering the anode scrap sheets 1 to the loading mechanism 50, interference between the anode scrap sheets 1 and the lift arm 73 is prevented by retraction of the lift arm. Then, after the bogie 52 moves to a position above the chute 20, the ball-screw mechanism 71 is driven to bring the lift-arm bogie 72 back to its starting position.

In the loading mechanism 50, after holding the anode scrap sheets 1 with the chuck 56, the first lifting cylinder 53 extends to raise the two anode scrap sheets 1, and the bogie 52 travels on the rails 51 to position the anode scrap sheets 1 above the chute 20. While the bogie 52 travels on the rails 51, the chuck 56 is caused to rotate by about 56° around the axis by the rotation mechanism connected to the chuck 56. The surfaces of the anode scrap sheets 1 are kept parallel with the width direction of the chute 20.

After positioning the bogie 52 above the chute 20, the air cylinder 32 of the outer shutter 30 retracts so that the linkage connected to the shutter body 31 opens the upper end portion of the chute 20. Then, after retraction of the first lifting cylinder 53 and descent of the anode scrap sheets 1 resulting from the extension of the second lifting cylinder 55, the chuck 56 releases the scrap sheet so as to charge the scrap sheets 1 into the chute 20. The engagements 1a formed on both shoulders of each of the anode scrap sheets 1 engage with the projections 83 provided on the receiving mechanism 80 (see FIGS. 4 and 5), and stop the sheets in the chute 20. Collision of the lower ends of the anode scrap sheets 1 with the inner shutter 40, and the resulting damage to the inner shutter 40, can thus be prevented.

After the air cylinder 32 extends and the shutter body 31 closes the upper end of the chute 20, the air cylinder 42 of the inner shutter 40 retracts, so that the shutter body 41 is moved back from the interior of the chute 20. Then, the rotation shaft 82 of the receiving mechanism 80 rotates, thus causing the projections 83 to rotate counterclockwise by about 80°. Engagement between the projections 83 and the two anode scrap sheets 1 are thus released and the anode scrap sheets 1 fall while sliding on the inner inclined surface of the chute 20.

Figure 6:
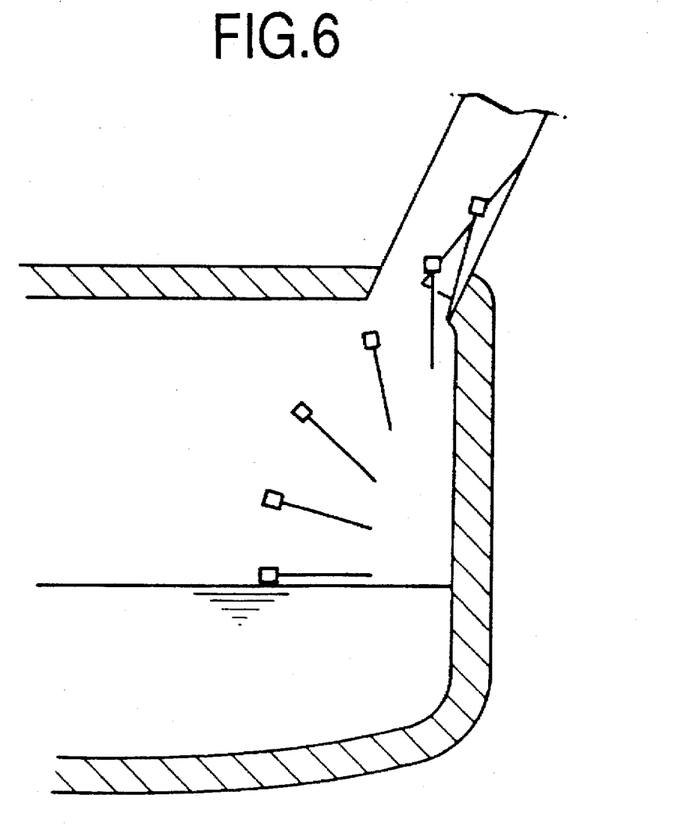
FIG. 6 is a schematic representation showing anode scrap being introduced into a conversion furnace in accordance with the first embodiment.

As the shoulders of the anode scrap sheets 1 reach the jump rails 90, they are caused to slide on the jump rails, so that the trailing ends of the anode scrap sheets 1 are raised above from the inclined surface of the chute 20 while the leading ends thereof continue to slide on the inclined inner surface 20a of the chute 20, whereby the anode scrap sheets 1 are caused to turn in a counterclockwise direction in FIG. 6 as it slides on the jump rails 90. In this manner, as the anode scrap sheets 1 reach the melt level in the converting furnace, their posture is in a generally horizontal position so that the anode scrap sheets do not impinge against the furnace bottom.

The air cylinder 42 is then extended so as to cause the shutter body 41 to close the chute 20, and at the same time, rotation of the rotation shaft 82 in the opposite direction (clockwise in FIG. 5) causes the projections 83 to return to the initial position.

By repeating the operations described above, it is possible to sequentially charge the anode scrap sheets into the converting furnace.

Figure 7:
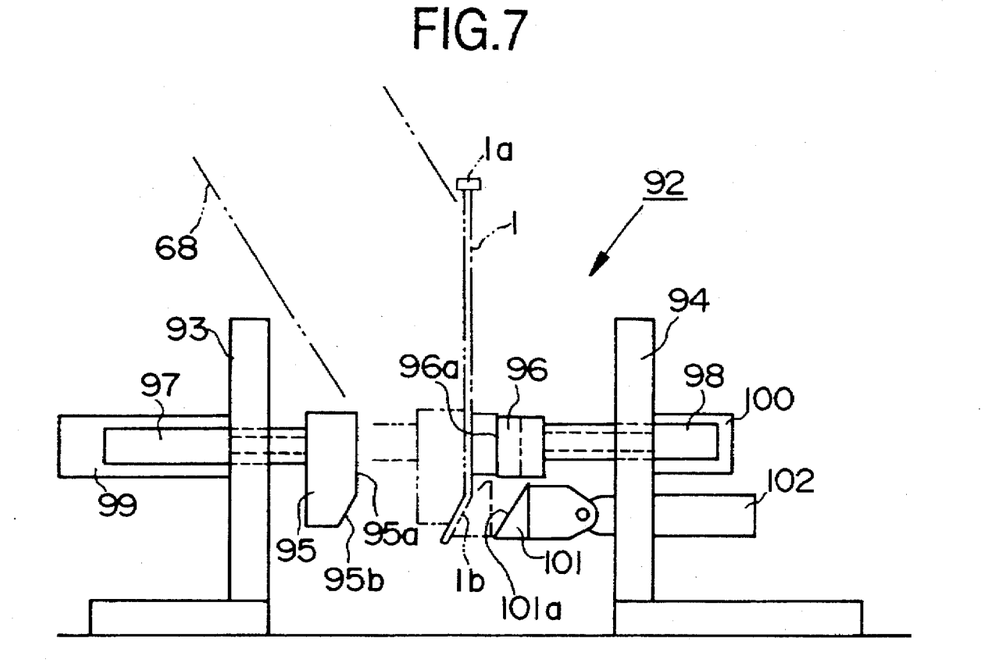
FIG. 7 is a side-elevational view of a press device provided in the installation in accordance with a second embodiment of the present invention.
Figure 8:
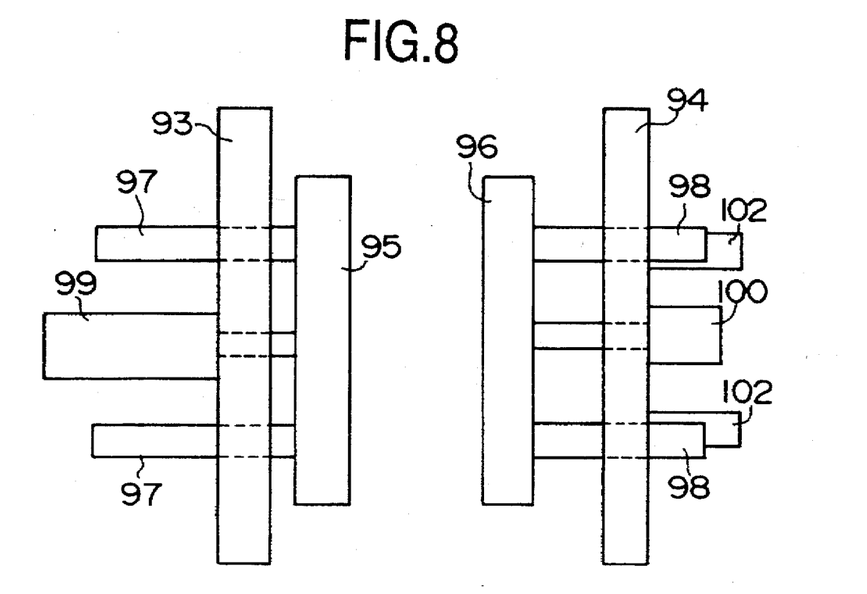
FIG. 8 is a plan view of the press device of FIG. 7.
Figure 9:
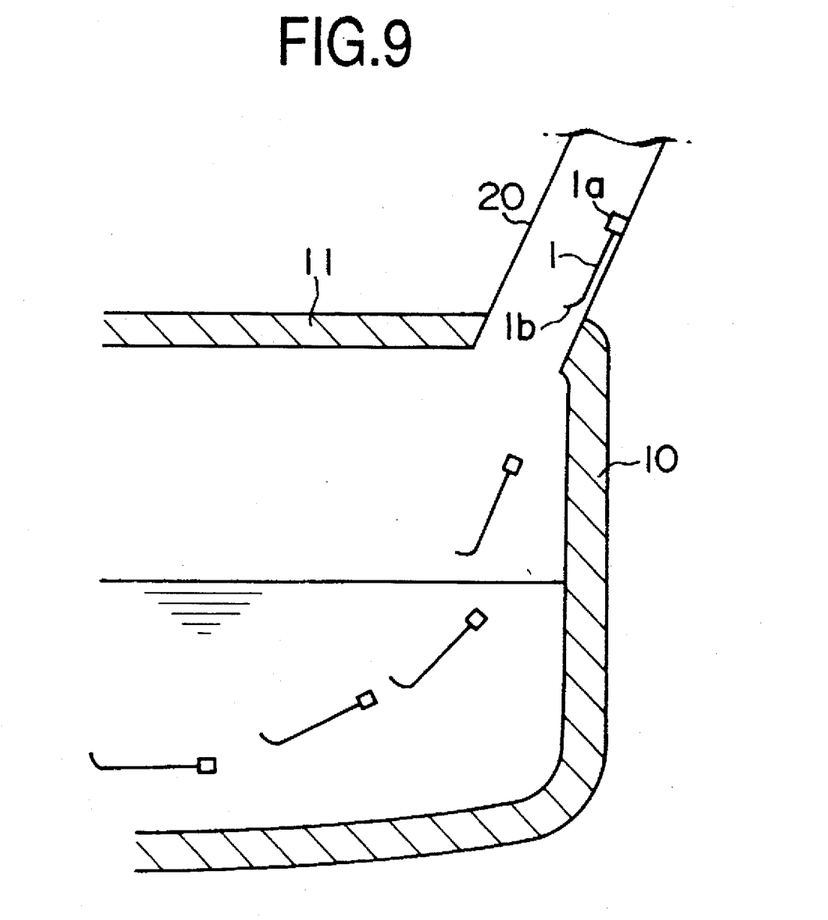
FIG. 9 is a view similar to FIG. 6, but showing anode scrap being introduced into a conversion furnace in accordance with the second embodiment of the invention.

FIGS. 7 to 9 depict a converting furnace installation in accordance with a second embodiment of the present invention, in which the parts or arrangements common with the first embodiment will be denoted using the same numerals and explanation thereof will be omitted.

In this embodiment, instead of the turning unit or jump rails, the impingement-preventing device is provided with a bending press 92 attached to the transfer mechanism 60 for bending the leading end of the anode scrap sheet 1 in such a direction that when the anode scrap sheet 1 is positioned in the chute 20, the bent portion 1b is directed upwards with respect to the inclined inner surface 20a of the chute 20. Namely, in this embodiment, the leading end of the anode scrap sheet 1 per se is bent by the bending press 92 prior to the charging of the anode scrap sheet 1. Due to the provision of such bent portion 1b in the anode scrap sheet 1, the anode scrap sheet 1 is prevented from impinging against the furnace bottom upon charging. More specifically, as schematically depicted in FIG. 9, when the bent leading end of the anode scrap sheet 1 reaches the melt in the converting furnace 10, the leading end tends to float in the melt due to the increase in the resistance exerted thereon and changes its posture gradually from a vertical one to a horizontal one. Thus, the anode scrap sheet 1 is prevented from impinging against the furnace bottom.

The bending angle and length of the bent portion 1b of the anode scrap sheet 1 may change depending upon the construction of the chute or the like, but according to the inventors' experimentation, the bending angle should be preferably from 10° to 45°, and more preferably from 20° to 45°, whereas the bending length should be preferably from 50 mm to 200 mm, and more preferably from 100 mm to 200 mm.

FIGS. 7 and 8 depict a detailed construction of the bending press 92 employed in the second embodiment of the invention. The bending press 92 comprises first and second frames 93 and 94 arranged adjacent to each other in the position where the second lifter 67 of the transfer mechanism 60 is placed, first and second holding members 95 and 96 supported by first and second frames 93 and 94 through first and second pairs of guide members 97 and 98, and first and second air cylinders 99 and 100 secured to the first and second holding members 95 and 96, respectively, for cooperating with each other to move the first and second holding members towards and away from each other. The first holding member 95 has a pressing surface including a vertical surface 95a formed at an upper side and an inclined surface 95b disposed at a lower side, whereas the second holding member 96 has a pressing surface 96a which is vertical and is designed to be opposed only to the vertical surface of the first holding member. Arranged below the second holding member 96 are a pair of bending members 101 each guided by the second frame 94 and actuated, respectively, by air cylinders 102 also supported by the second frame 94. Each bending member 101 has an inclined surface 101a to be complementary to a part of the inclined surface 95b of the first holding member 95. With the actuation of the first and second holding members 95 and 96, the anode scrap sheet 1 is sandwiched therebetween, and with the actuation of the bending member 101, the lower end (leading end) of the anode scrap sheet 1 is pressed by the bending member against the inclined surface 95b of the first holding member 95, so that the lower end of the anode scrap sheet 1 is bent at a prescribed angle.

The operation of the installation in accordance with the second embodiment is quite similar to that of the first embodiment, except for that of the impingement-preventing means. The operation of the bending press 92 will be understood from the previous explanation without difficulty, so that further explanation is omitted.

Obviously, many modifications and variations of the present invention are possible in the light of the above teachings. It is therefore to be understood that within the scope of the appended claims, the invention may be practiced otherwise than as specifically described.

What is claimed is:

1. A metallurgical furnace installation comprising:

a metallurgical furnace including a furnace bottom and an upper portion having an opening formed therethrough;

a charging assembly disposed adjacent to said opening for introducing anode scrap into said metallurgical furnace through said opening, said charging assembly including a chute for introducing said anode scrap into said metallurgical furnace; and an impingement-preventing device disposed in said chute of said charging assembly for preventing said anode scrap from impinging on said furnace bottom during charging, said impingement-preventing device including a pair of jump rails disposed in said chute and inclined relative to said chute for turning the anode scrap being introduced by said chute.

2. The metallurgical furnace installation as recited in claim 1, wherein said anode scrap is in the form of a plate of a generally rectangular shape having a pair of leading and trailing ends and having a pair of laterally outwardly-extending shoulder protrusions formed at said trailing end, and wherein said chute is inclined and is attached to said upper portion of said metallurgical furnace and constructed to introduce said anode scrap into said metallurgical furnace in an inclined manner such that said leading end is directed towards the furnace bottom while said trailing end is positioned away from the furnace bottom.

3. A metallurgical furnace installation comprising:

a metallurgical furnace including a furnace bottom and an upper portion having an opening formed therethrough;

a charging assembly disposed adjacent to said opening for introducing anode scrap into said metallurgical furnace through said opening; and an impingement-preventing device attached to said charging assembly for preventing said anode scrap from impinging on said furnace bottom during charging;

wherein said anode scrap is in the form of a plate of a generally rectangular shape having a pair of leading and trailing ends and having a pair of laterally outwardly-extending shoulder protrusions formed at said trailing end, said charging assembly having an inclined chute attached to said upper portion of said metallurgical furnace and constructed to introduce said anode scrap into said metallurgical furnace in an inclined manner such that said leading end is directed towards the furnace bottom while said trailing end is positioned away from the furnace bottom; and wherein said impingement-preventing device comprises turning means attached to said chute for turning the anode scrap being introduced by said chute in a vertical plane.

4. A metallurgical furnace installation comprising:

a metallurgical furnace including a furnace bottom and an upper portion having an opening formed therethrough;

a charging assembly disposed adjacent to said opening for introducing anode scrap into said metallurgical furnace through said opening; and an impingement-preventing device attached to said charging assembly for preventing said anode scrap from impinging on said furnace bottom during charging;

wherein said anode scrap is in the form of a plate of a generally rectangular shape having a pair of leading and trailing ends and having a pair of laterally outwardly-extending shoulder protrusions formed at said trailing end, said charging assembly having an inclined chute attached to said upper portion of said metallurgical furnace and constructed to introduce said anode scrap into said metallurgical furnace in an inclined manner such that said leading end is directed towards the furnace bottom while said trailing end is positioned away from the furnace bottom; and wherein said impingement-preventing device includes a bending press for bending said leading end of said anode scrap.

5. The metallurgical furnace installation as recited in claim 4, wherein said bending press is arranged to bend said leading end of said anode scrap in such a direction that when said anode scrap is positioned in said chute, a bent portion is directed upwards with respect to an inclination of said chute.

6. The metallurgical furnace installation as recited in claim 3, wherein said inclined chute includes an inclined surface inclined forwardly and downwardly towards said furnace bottom, said turning means including at least one pair of jump rails disposed on said inclined surface and constructed to hold said shoulder protrusions of the anode scrap, said jump rails extending upwardly with respect to said inclined surface in a direction towards the furnace bottom, whereby the trailing end of the anode scrap slides up on the the jump rails while the leading end thereof slides on the inclined surface of said chute.

7. The metallurgical furnace installation as recited in claim 6, wherein said jump rails are constructed and dimensioned such that when said anode scrap reaches a melt in the metallurgical furnace, said anode scrap is in a generally horizontal attitude.

8. The metallurgical furnace installation as recited in claim 4, wherein said bending press includes:

first and second holding members operably associated with each other for releasably holding the anode scrap therebetween, said first and second holding members having pressing portions facing towards each other, said first holding member further including an inclined portion; and a bending member disposed in opposed relation to said inclined portion of said first holding member, said bending member being operable to press the leading end of the anode scrap against said inclined portion of said first holding member.

9. A method for charging into a melt of a metallurgical furnace anode scrap which is in the form of a generally rectangular shape having a pair of leading and trailing ends and having a pair of laterally outwardly-extending shoulder protrusions formed at said trailing end, said method comprising the step of charging into the melt of said metallurgical furnace while preventing the anode scrap from impinging on a furnace bottom during charging;

wherein said charging step comprises the step of turning said anode scrap in a vertical plane to increase resistance to be exerted by the melt on the anode scrap to such an extent that the anode scrap does not directly travel to the furnace bottom on charging.

10. The method as recited in claim 9, wherein in said charging step the anode scrap is turned such that when the anode scrap reaches the melt in the metallurgical furnace, the anode scrap is brought into a generally horizontal posture.

11. A method for charging into a melt of a metallurgical furnace anode scrap which is in the form of a generally rectangular shape having a pair of leading and trailing ends and having a pair of laterally outwardly-extending shoulder protrusions formed at said trailing end, said method comprising the step of charging into the melt of said metallurgical furnace while preventing the anode scrap from impinging on a furnace bottom during charging;

wherein said charging step comprises the step of bending the leading end of said anode scrap.

12. The method as recited in claim 11, wherein said step of bending includes bending said anode scrap in such a direction that when the anode scrap is introduced in the metallurgical furnace, a bent portion is directed upwards with respect to a direction of introduction of the anode scrap.

13. The metallurgical furnace installation as recited in claim 1, further including a first shutter for closing an upper end of said chute, and a second shutter disposed along said chute at a location below said first shutter, and wherein said pair of jump rails are disposed below said second shutter.

14. The metallurgical furnace installation as recited in claim 1, wherein said chute is inclined at least at a location at which said pair of jump rails is disposed.

15. A metallurgical furnace installation comprising:

a metallurgical furnace including a furnace bottom and an upper portion having an opening formed therethrough;

a charging assembly disposed adjacent to said opening for introducing anode scrap into said metallurgical furnace through said opening; and an impingement-preventing device attached to said charging assembly for preventing said anode scrap from impinging on said furnace bottom during charging, wherein said impingement-preventing device includes a bending press for bending a leading end of said anode scrap.

* * * * *